(12) United States Patent
Conter

(10) Patent No.: US 10,560,753 B2
(45) Date of Patent: *Feb. 11, 2020

(54) METHOD AND SYSTEM FOR IMAGE ALTERATION

(71) Applicant: AT&T INTELLECTUAL PROPERTY I, L.P., Atlanta, GA (US)

(72) Inventor: Ryan Kenneth Conter, Streamwood, IL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/357,662

(22) Filed: Nov. 21, 2016

(65) Prior Publication Data

US 2017/0127134 A1 May 4, 2017

Related U.S. Application Data

(63) Continuation of application No. 14/966,596, filed on Dec. 11, 2015, now Pat. No. 9,538,247, which is a
(Continued)

(51) Int. Cl.
*H04N 7/16* (2011.01)
*H04N 21/475* (2011.01)
(Continued)

(52) U.S. Cl.
CPC ....... *H04N 21/4751* (2013.01); *G06T 3/0093* (2013.01); *H04N 5/2628* (2013.01);
(Continued)

(58) Field of Classification Search
CPC ......... H04N 21/4756; H04N 21/64322; H04N 21/26283; H04N 21/472; H04N 21/4751;
(Continued)

(56) References Cited

U.S. PATENT DOCUMENTS 5,195,135 A * 3/1993 Palmer ..................... H04N 5/74
348/E5.096
5,589,893 A 12/1996 Gaughan
(Continued)

OTHER PUBLICATIONS

"About.com Graphics Software", http://video.about.com/graphicssoft/coloring-book.htm, (Viewed Jul. 31, 2007), 2 pgs.
(Continued)

*Primary Examiner* — Mulugeta Mengesha
(74) *Attorney, Agent, or Firm* — Guntin & Gust, PLC; Atanu Das

(57) ABSTRACT

Methods and systems for image alteration. A video signal having multiple images is accessed, and images are altered to blur the video signal based on a subscriber alteration request. The alteration request is selectable among a partial blur, a full blur, and a restore image. The request includes instructions to selectably blur a partial portion of an image by stretching a first portion, without stretching a second portion. The alteration includes accessing an alternation setting selected from a cycle of alteration settings, a group of preprogrammed alteration settings and combinations thereof. The blurred video signal is provide for presentation by subscriber equipment. The video signal is restored in response to a restorative event detected within the blurred video signal. The detecting of the restorative event includes determining a location of a scene change in the blurred video signal.

20 Claims, 7 Drawing Sheets

Related U.S. Application Data continuation of application No. 11/839,289, filed on Aug. 15, 2007, now Pat. No. 9,241,135.

(51) Int. Cl.

| | | |
|---|---|---|
| *H04N 7/173* | (2011.01) | |
| *H04N 21/422* | (2011.01) | |
| *H04N 21/431* | (2011.01) | |
| *H04N 21/44* | (2011.01) | |
| *H04N 21/4545* | (2011.01) | |
| *H04N 21/61* | (2011.01) | |
| *H04N 21/81* | (2011.01) | |
| *H04N 21/845* | (2011.01) | |
| *G06T 3/00* | (2006.01) | |
| *H04N 5/262* | (2006.01) | |
| *H04N 21/454* | (2011.01) | |
| *H04N 5/14* | (2006.01) | |

(52) U.S. Cl.
CPC ......... *H04N 7/173* (2013.01); *H04N 7/17336* (2013.01); *H04N 21/42204* (2013.01); *H04N 21/4318* (2013.01); *H04N 21/44008* (2013.01); *H04N 21/4542* (2013.01); *H04N 21/45455* (2013.01); *H04N 21/4756* (2013.01); *H04N 21/6125* (2013.01); *H04N 21/812* (2013.01); *H04N 21/845* (2013.01); *H04N 21/8456* (2013.01); *H04N 5/147* (2013.01)

(58) Field of Classification Search
CPC ......... H04N 21/42204; H04N 21/4318; H04N 21/44008; H04N 21/4542; H04N 21/45455; H04N 21/6125; H04N 21/812; H04N 21/845; H04N 21/8456; H04N 5/147; H04N 5/2628; H04N 7/173; H04N 7/17336; G06T 3/0093
USPC .................. 725/135, 32, 86, 37, 18, 60, 131
See application file for complete search history.

(56) References Cited

U.S. PATENT DOCUMENTS

| | | | |
|---|---|---|---|
| 5,768,419 A * | 6/1998 | Gundlach | H04N 7/17318 |
| | | | 348/E7.061 |
| 5,999,229 A * | 12/1999 | Samarughi | H04N 5/44 |
| | | | 348/633 |
| 6,263,500 B1 | 7/2001 | Yoshida | |
| 6,426,705 B1 | 7/2002 | Wischoeffer | |
| 6,429,879 B1 | 8/2002 | Sturgeon | |
| 6,504,990 B1 | 1/2003 | Abecassis | |
| 6,722,984 B1 | 4/2004 | Sweeney | |
| 6,724,435 B2 | 4/2004 | Segman | |
| 6,732,367 B1 | 5/2004 | Ellis | |
| 6,944,876 B1 | 9/2005 | Whitelaw | |
| 6,976,265 B1 | 12/2005 | Yang | |
| 7,134,130 B1 | 11/2006 | Thomas | |
| 7,490,340 B2 * | 2/2009 | Hamzy | H04N 7/1675 |
| | | | 348/156 |
| 7,590,302 B1 * | 9/2009 | Woodall | G06T 5/003 |
| | | | 382/263 |
| 2002/0087403 A1 | 7/2002 | Meyers | |
| 2002/0147782 A1 | 10/2002 | Dimitrova | |
| 2005/0091498 A1 | 4/2005 | Williams et al. | |
| 2005/0212968 A1 * | 9/2005 | Ryal | H04N 5/04 |
| | | | 348/565 |
| 2006/0277564 A1 | 12/2006 | Jarman | |
| 2007/0064147 A1 | 3/2007 | Kondo | |
| 2007/0101394 A1 * | 5/2007 | Fu | G11B 27/105 |
| | | | 725/134 |
| 2007/0165144 A1 | 7/2007 | Bennett | |
| 2007/0297641 A1 | 12/2007 | Criddle | |
| 2008/0256192 A1 * | 10/2008 | Pinard | G06Q 30/02 |
| | | | 709/206 |

OTHER PUBLICATIONS

"ClearPlay Filter Cart", www.clearplay.com/filtercart.aspx, (Viewed Aug. 15, 2006),3 pgs.
"ClearPlay Press Releases—ClearPlay Responds to CleanFlicks Ruling", http://www.clearplay.com/Press.aspx?pid=22 (Jul. 7, 2006), 2 pgs.

* cited by examiner

METHOD AND SYSTEM FOR IMAGE ALTERATION

CROSS-REFERENCE TO RELATED APPLICATIONS

This application is a Continuation of and claims priority to U.S. patent application Ser. No. 14/966,596 filed Dec. 11, 2015, which is a Continuation of and claims priority to U.S. patent application Ser. No. 11/839,289 filed Aug. 15, 2007. The contents of each of the foregoing are hereby incorporated by reference into this application as if set forth herein in full.

FIELD OF THE DISCLOSURE

This application relates to a method and system for video signaling, and more specifically to methods and systems for image alteration.

BACKGROUND OF THE DISCLOSURE

Television programs, movies and other content sometimes include material that is inappropriate and/or otherwise undesirable for viewing by some viewers. For example, parents may not wish to let their children see images they deem too graphic.

A user of a display device presenting the content may seek to avoid presentation of the content by turning off the display device, fast forwarding through the content, or changing channels.

BRIEF DESCRIPTION OF THE DRAWINGS

Embodiments are illustrated by way of example and not limitation in the figures of the accompanying drawings, in which like references indicate similar elements and in which.

DETAILED DESCRIPTION OF THE DRAWINGS

Example methods and systems for image alteration are described. In the following description, for purposes of explanation, numerous specific details are set forth in order to provide a thorough understanding of example embodiments. It will be evident, however, to one skilled in the art that the present invention may be practiced without these specific details.

In an example embodiment, a video signal having a plurality of images may be accessed. An alteration request may be received from a user. A portion of the plurality of images of the video signal may be altered to blur the video signal. The blurred video signal may be provided for presentation.

Figure 1:
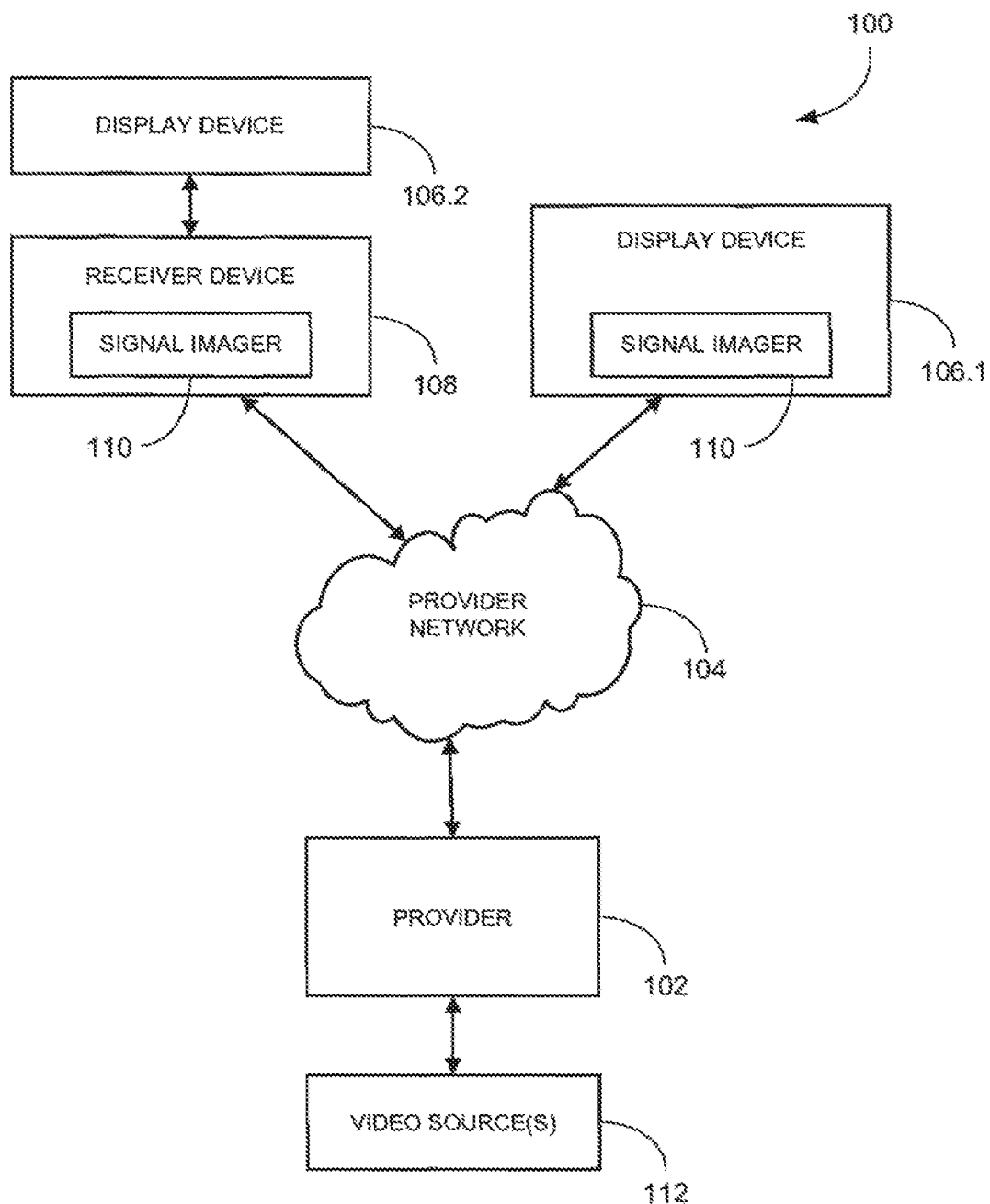
FIGS. 1-3 are block diagrams of example video systems according to an example embodiment.

FIG. 1 illustrates an example video system 100. The video system 100 includes a provider 102 that may provide a video signal over a provider network 104 to a display device 106.1 and/or to a display device 106.2 through a receiver device 108.

The video signal may be a sequence of images and one or more associated audio tracks. The video signal may be a high quality video stream (e.g., MPEG-4) that is transcoded for distribution to the display device 106.1 and/or the receiver device 108. The video signal may include standard definition (SD) or high definition (HD) video signals in NTSC (National Television System Committee), PAL (Phase Alternation Line), SECAM (Systeme Electronique Couleur Avec Memoire), sequence of bitmaps or other signal formats that transport a sequence of images. The form of the video signal may be modified to enable implementations of various formats and resolutions. The video signal may provide a variety of content types including, without limitation, television programs, music, movies, and commercials.

The provider 102 may be a television station, broadcast network, filer server, or the like. The provider network 104 may be a television distribution network, Global System for Mobile Communications (GSM) network, an Internet Protocol (IP) network, a Wireless Application Protocol (WAP) network, and/or a Wifi network. Other networks may also be used.

The display device 106.1, 106.2, may be a television monitor, a mobile telephone, a portable gaming device, a personal digital assistant (PDA), a computer monitor, and the like. Other types of display devices may also be used.

A signal imager 110 may be embodied within the display device 106.1 and/or the receiver device 108 to enable presentation of a blurred video signal. Examples of the receiver device 108 include a set-top box, a receiver card, a mobile phone, and a computing system; however other devices may also be used. An example embodiment of the signal imager 110 is described in greater detail below.

Figure 2:
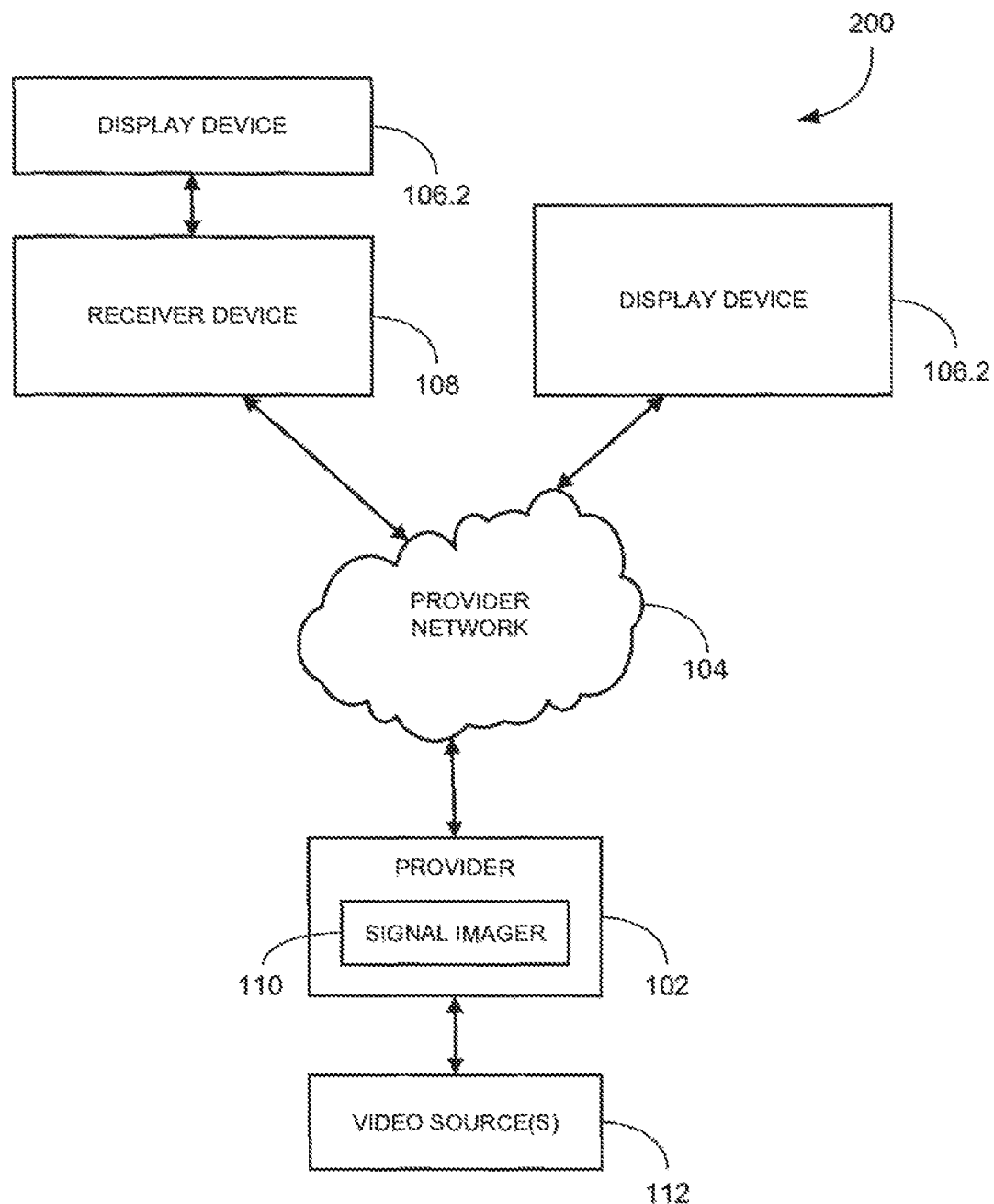

FIG. 2 illustrates an example video system 200. The video system 200 includes the provider 102 that may provide a video signal over the provider network 104 to the display device 106.1 and/or to the display device 106.2 through the receiver device 108. The signal imager 110 may be embodied within the provider 102 to enable presentation of a blurred video signal as described in greater detail below.

Figure 3:
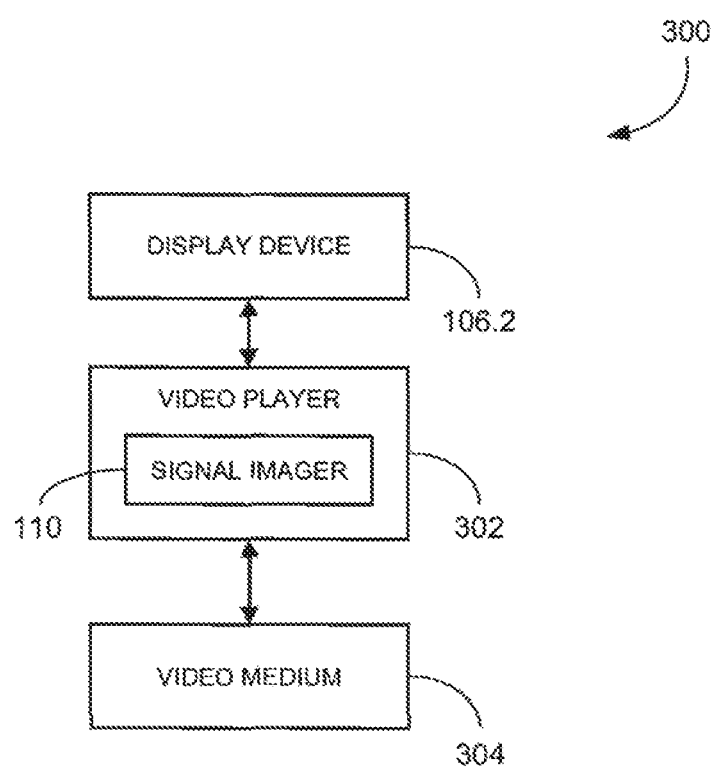

FIG. 3 illustrates an example video system 300. A video signal embodied on a video medium 304 may be provided to the display device 106.2 through a video player 302. Examples of video players 302 include a professional grade video tape player, a camcorder, a video file server, a computer with an output port and a digital versatile disc (DVD) player. Other types of video players may also be used. The signal imager 110 may be embodied in the video player 302 and/or the display device 106.2 to enable presentation of a blurred video signal as described in greater detail below.

Figure 4:
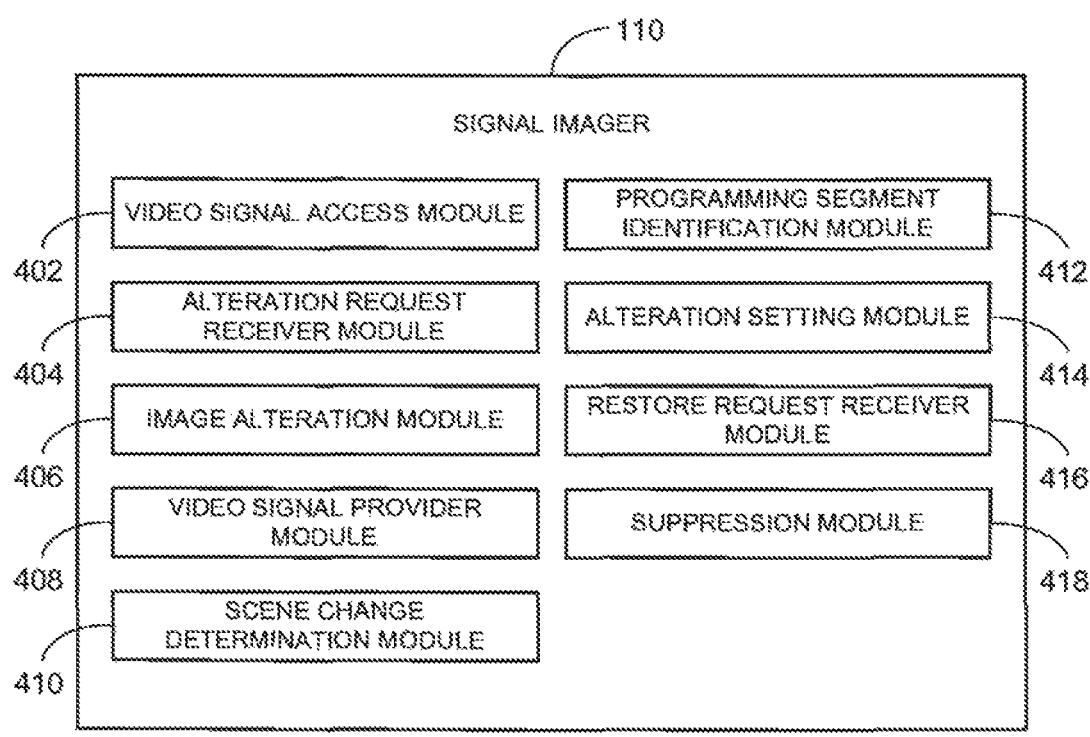
FIG. 4 is a block diagram of an example signal imager that may be deployed in the video systems of FIG. 1, FIG. 2, or FIG. 3 according to an example embodiment.

FIG. 4 illustrates an example signal imager 110 that may be deployed in the video system 100, the video system 200, the video system 300 and/or another system (see FIGS. 1-3).

The signal imager 110 may include a video signal access module 402, an alteration request receiver module 404, an image alteration module 406, a video signal provider module 408, a scene change determination module 410, a programming segment determination module 412, an alteration setting module 414, a restore request receiver module 416, and/or a suppression module 418. Other modules may also be used.

The video signal access module 402 accesses a video signal having a number of images. The alteration request receiver module 404 receives an alteration request from a user. The alteration request may be received through a remote control (e.g., by use of a hot key on the remote control) that is operable to control the display device 106.1, 106.2, the receiver device 108, and/or the video player 302. The image alteration module 406 alters a portion of the images (e.g. a partial portion or the entire portion) of the video signal to blur the video signal. The video signal provider module 408 provides the video signal and/or blurred video signal for presentation.

The scene change determination module 410 determines a location in the video signal of a next scene change. The video signal may be provided by the video signal provider module 408 until the next scene change.

The programming segment determination module 412 identifies a next programming segment in the video signal. The video signal may be provided by the video signal provider module 408 until the next programming segment.

The alteration setting module 414 accesses an alteration setting. The accessed alteration setting may be used by the alteration request receiver module 404 to alter the images of the video signal to blur the video signal based on the alteration setting.

The restore request receiver module 416 receives a restore request from a user. The video signal may be provided for presentation from the video signal provider module 408 based on receipt of the restore request.

The suppression module 418 suppresses an audio track of the blurred video signal.

Figure 5:
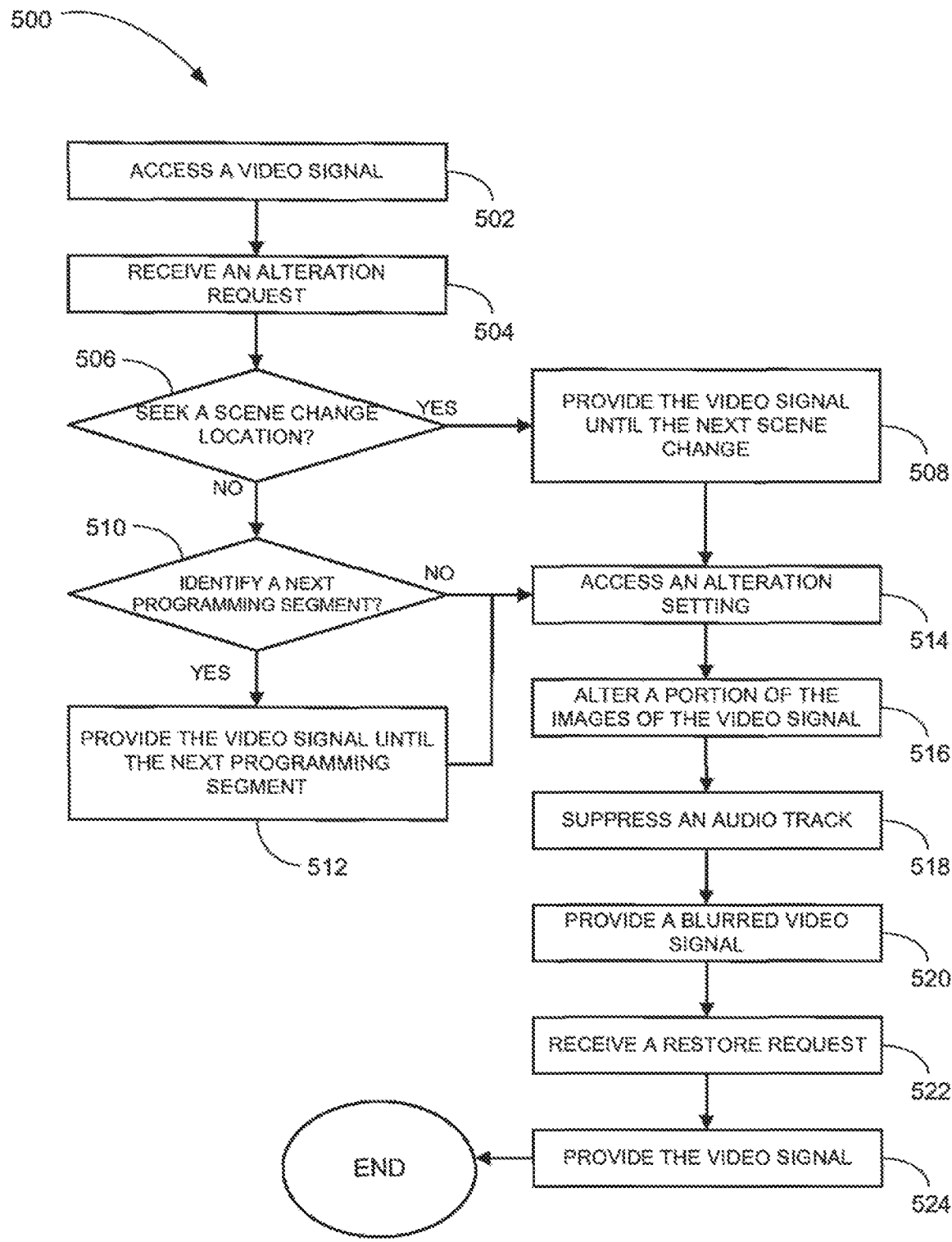
FIG. 5 is a flowchart illustrating a method for image alteration in accordance with an example embodiment.

FIG. 5 illustrates a method 500 for image alteration according to an example embodiment. The method 500 may be performed by the signal imager 110 in the video system 100, the video system 200, the video system 300, and/or in another system.

A video signal having a number of images is accessed at block 502. The video signal may be accessed by receiving the video signal over the provider network 104 (e.g., an internet protocol (IP) network), accessing the video signal from the video medium 304 (see FIG. 3), or the like. The video signal may be a live video signal (e.g., from the video source 112) or a previously recorded video signal (e.g., from the video medium 304).

An alteration request is received from a user at block 504. The alteration request may be received from the user through a remote control, through a network, or otherwise received from the user. The alteration request may not be pre-stored (e.g., on the receiver device 108, the display device 106.1, the provider 102, or the video player 302), but may rather be provided in real-time by the user while watching the content provided by the video signal.

At decision block 506, a determination may be made whether to seek a location in the video signal of a next scene change. Scene changes, in an example embodiment, may be used to determine when to start and/or stop blurring the video signal. If a determination is made to seek the location of the next scene change, the video signal may be provided (e.g., in an unaltered form) until the next scene change of the video signal is found at block 508. If a determination is made not to seek the location of the next scene change at decision block 506, the method 500 may proceed to decision block 510.

A determination may be made at decision block 510 whether to identify a next programming segment in the video signal. The next programming segment may be, by way of example, a next chapter on the video medium 304, a next news story, or the like. Programming segments, in an example embodiment, may be used to determine when to start and/or stop blurring the video signal.

If a determination is made to identify the next programming segment, the video signal may be provided (e.g., in an unaltered form) until the next programming segment is identified at block 512. If a determination is made not to identify the next programming segment at decision block 510, or upon completion of the operations at block 508 or block 512, the method 500 may proceed to block 514.

An alteration setting may be accessed at block 514. The alteration setting may be accessed from a single alteration setting or from among a number of alteration settings. The number of alteration settings may be in a cycle of alteration settings, preprogrammed alteration settings (e.g., by the user or an administrator), or the like. By way of an example, a user may click a remote control a number of times select a different alteration setting (e.g., partial blur, full blur, and restored image). The alteration setting may be stored on the display device 106.1, the receiver device 108, the provider 102, the video player 302, or otherwise accessed.

A portion of the images of the video signal is altered at block 516 to blur the video signal. The video signal may be blurred by reducing resolution of the video signal (e.g., to blur out one or more forms in the images of the video signal), stretching the images of the video signal, including stretching the portion of the plurality of images, setting at least one pixel value (e.g., chrominance or luminance) of a plurality of pixels of the images of the video signal to a constant value (e.g., turning the images into a single color), desaturating and inverting at least one object in the images of the video signal, or the like. The alteration to the video signal may prevent some or all features of the images of the video signal from being discernable when presented. In an example embodiment, altering the images of the video signal instead may prevent a user from viewing undesirable images without incurring a delay by changing channels or turning off the display device 106.1, 106.2 or the receiver device 108. The images of the video signal may be converted into a single color to blur the video signal.

The portion of the images of the video signal may include a partial portion or an entire portion of the images of the video signal. The images may be consecutive images or inconsecutive images of the video signal. Other types of image selection may also be used.

An audio track of the blurred video signal may be suppressed at block 518. For example, the volume of the audio track may be lowered or muted.

The blurred video signal is provided for presentation at block 520. The blurred video signal may be partially or fully scrambled or otherwise obscured to prevent a user from viewing the images or a portion of the images of the video signal. The blurred video signal may block out or distort the images or a portion of the images of the video signal. The blurred video signal may be presented on a display (e.g., of the display device 106.1), provided to the display device 106.2, or otherwise provided for presentation.

In an example embodiment, during the operations at block 520 the blurred video signal may be provided based on the alteration setting.

At block 522, a restore request may be received from a user. The restore request may be an indication from the user that the images containing objectionable content is believed to no longer be present in the video signal.

The video signal may be provided for presentation at block 524. The video signal may be provided in response to the restore request, expiration of a certain period of time, detecting a scene change and/or a next programming segment in the blurred video signal, and the like.

Figure 6:
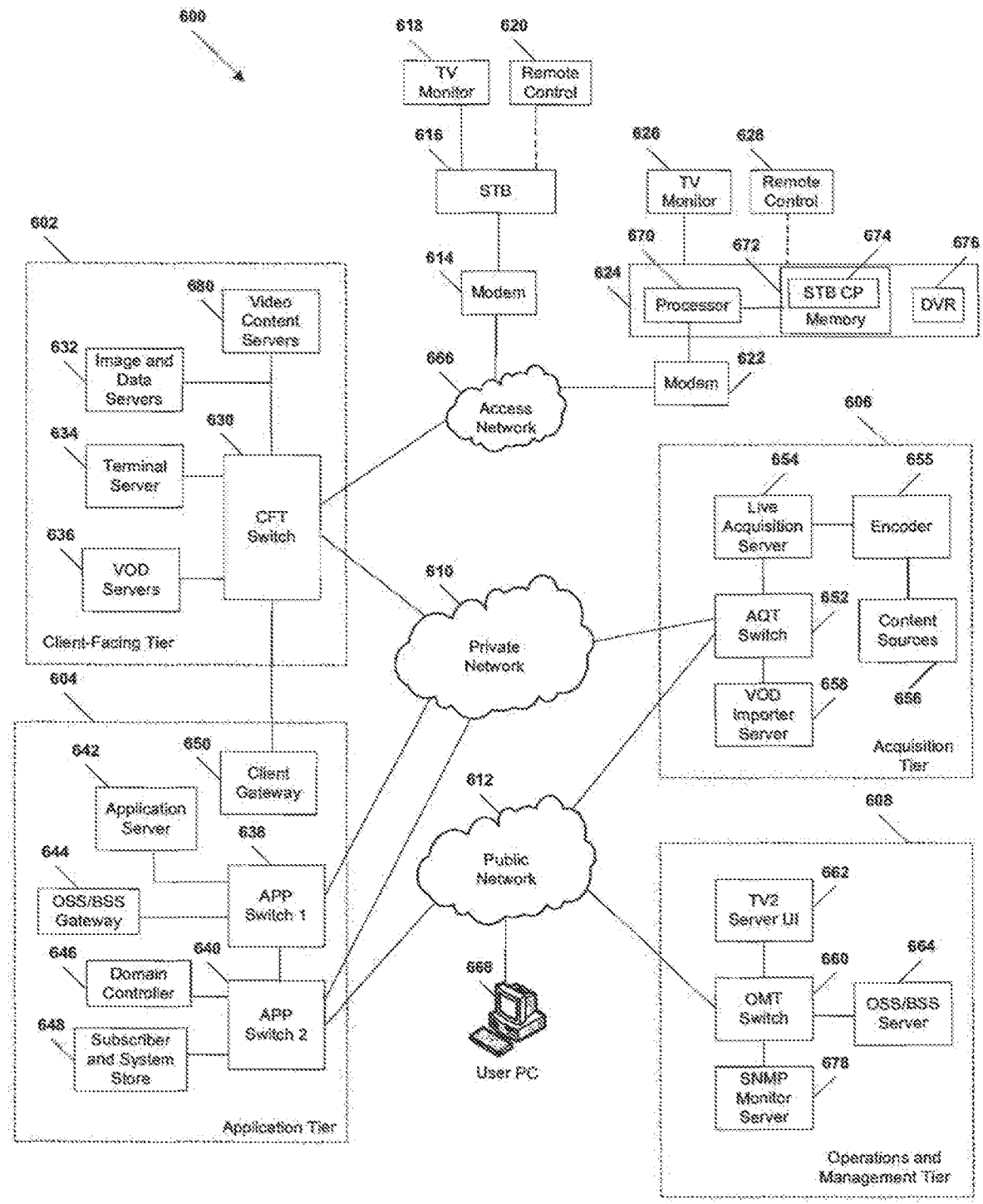
FIG. 6 is a block diagram of an IPTV system in which the video system of FIG. 1, FIG. 2, or FIG. 3 may be deployed in accordance with an example embodiment.

FIG. 6 illustrates an example embodiment of an Internet Protocol Television (IPTV) system 600 in which the video system 100, the video system 200, and/or the video system 300 (see FIGS. 1-3). However, the video systems 100, 200, 300 may be deployed in other types of IPTV and non-IPTV video systems.

The system 600 as illustrated may include a client facing tier 602, an application tier 604, an acquisition tier 606, and an operations and management tier 608. Each tier 602, 604, 606, 608 is coupled to a private network 610; to a public network 612, such as the Internet; or to both the private network 610 and the public network 612. For example, the client-facing tier 602 may be coupled to the private network 610. Further, the application tier 604 may be coupled to the private network 610 and to the public network 612. The acquisition tier 606 may also be coupled to the private network 610 and to the public network 612. Additionally, the operations and management tier 608 may be coupled to the public network 612.

As illustrated in FIG. 6, the various tiers 602, 604, 606, 608 communicate with each other via the private network 610 and the public network 612. For instance, the client-facing tier 602 may communicate with the application tier 604 and the acquisition tier 606 via the private network 610. The application tier 604 may also communicate with the acquisition tier 606 via the private network 610. Further, the application tier 604 may communicate with the acquisition tier 606 and the operations and management tier 608 via the public network 612. Moreover, the acquisition tier 606 may communicate with the operations and management tier 608 via the public network 612. In a particular embodiment, elements of the application tier 604, including, but not limited to, a client gateway 650, may communicate directly with the client-facing tier 602.

As illustrated in FIG. 6, the client-facing tier 602 may communicate with user equipment via a private access network 666 (e.g., the provider network 104 of FIG. 1), such as an Internet Protocol Television (IPTV) access network. In an illustrative embodiment, modems, such as a first modem 614 and a second modem 622 may be coupled to the private access network 666. The client-facing tier 602 may communicate with a first representative set-top box device 616 via the first modem 614 and with a second representative set-top box device 624 via the second modem 622. The client-facing tier 602 may communicate with a large number of set-top boxes, such as the representative set-top boxes 616, 624, (e.g., the receiver device 108 of FIG. 1) over a wide geographic area, such as a regional area, a metropolitan area, a viewing area, a designated market area or any other suitable geographic area, market area, or subscriber or customer group that may be supported by networking the client-facing tier 602 to numerous set-top box devices. In an illustrative embodiment, the client-facing tier, or any portion thereof, may be included at a video head-end office.

In a particular embodiment, the client-facing tier 602 may be coupled to the modems 614, 622 via fiber optic cables. Alternatively, the modems 614 and 622 may be digital subscriber line (DSL) modems that are coupled to one or more network nodes via twisted pairs, and the client-facing tier 602 may be coupled to the network nodes via fiber-optic cables. Each set-top box device 616, 624 may process data received via the private access network 666, via an IPTV software platform, such as Microsoft® TV IPTV Edition. In another embodiment, representative set-top boxes 616, 624 may receive data from private access network 666 through RF and other cable and/or satellite based networks.

Additionally, the first set-top box device 616 may be coupled to a first external display device, such as a first television monitor 618, and the second set-top box device 624 may be coupled to a second external display device, such as a second television monitor 626 (e.g., the display device 106.1, 106.2, of FIG. 1). Moreover, the first set-top box device 616 may communicate with a first remote control 620, and the second set-top box device may communicate with a second remote control 628.

In an example, non-limiting embodiment, each set-top box device 616, 624 may receive video content, which may include video and audio portions, from the client-facing tier 602 via the private access network 666. The set-top boxes 616, 624 may transmit the video content to an external display device, such as the television monitors 618, 626. Further, the set-top box devices 616, 624 may each include a STB processor, such as STB processor 670, and a STB memory device, such as STB memory 672, which is accessible to the STB processor 670. In one embodiment, a computer program, such as the STB computer program 674, may be embedded within the STB memory device 672. Each set-top box device 616, 624 may also include a video content storage module, such as a digital video recorder (DVR) 676. In a particular embodiment, the set-top box devices 616, 624 may communicate commands received from the remote control devices 620, 628 to the client-facing tier 602 via the private access network 666.

In an illustrative embodiment, the client-facing tier 602 may include a client-facing tier (CFT) switch 630 that manages communication between the client-facing tier 602 and the private access network 666 and between the client-facing tier 602 and the private network 610. As shown, the CFT switch 630 is coupled to one or more image and data servers 632 that store still images associated with programs of various IPTV channels. The image and data servers 632 may also store data related to various channels, e.g., types of data related to the channels and to programs or video content displayed via the channels. In an illustrative embodiment, the image and data servers 632 may be a cluster of servers, each of which may store still images, channel and program-related data, or any combination thereof. The CFT switch 630 may also be coupled to a terminal server 634 that provides terminal devices with a connection point to the private network 610. In a particular embodiment, the CFT switch 630 may also be coupled to one or more video-on-demand (VOD) servers 636 that store or provide VOD content imported by the IPTV system 600. In an illustrative, non-limiting embodiment, the VOD content servers 680 may include one or more unicast servers.

The client-facing tier 602 may also include one or more video content servers 680 that transmit video content requested by viewers via their set-top boxes 616, 624. In an illustrative, non-limiting embodiment, the video content servers 680 may include one or more multicast servers.

As illustrated in FIG. 6, the application tier 604 may communicate with both the private network 610 and the public network 612. The application tier 604 may include a first application tier (APP) switch 638 and a second APP switch 640. In a particular embodiment, the first APP switch 638 may be coupled to the second APP switch 640. The first APP switch 638 may be coupled to an application server 642 and to an OSS/BSS gateway 644. In a particular embodiment, the application server 642 may provide applications to the set-top box devices 616, 624 via the private access network 666, which enable the set-top box devices 616, 624 to provide functions, such as display, messaging, processing of IPTV data and VOD material, etc. In a particular embodiment, the OSS/BSS gateway 644 includes operation systems and support (OSS) data, as well as billing systems and support (BSS) data. In one embodiment, the OSS/BSS gateway may provide or restrict access to an OSS/BSS server 664 that stores operations and billing systems data.

Further, the second APP switch 640 may be coupled to a domain controller 646 that provides web access, for example, to users via the public network 612. For example, the domain controller 646 may provide remote web access to IPTV account information via the public network 612, which users may access using their personal computers 658. The second APP switch 640 may be coupled to a subscriber and system store 648 that includes account information, such as account information that is associated with users who access the system 600 via the private network 610 or the public network 612. In a particular embodiment, the application tier 604 may also include a client gateway 650 that communicates data directly with the client-facing tier 602. In this embodiment, the client gateway 650 may be coupled directly to the CFT switch 630. The client gateway 650 may provide user access to the private network 610 and the tiers coupled thereto.

In a particular embodiment, the set-top box devices 616, 624 may access the IPTV system 600 via the private access network 666, using information received from the client gateway 650. In this embodiment, the private access network 666 may provide security for the private network 610. User devices may access the client gateway 650 via the private access network 666, and the client gateway 650 may allow such devices to access the private network 610 once the devices are authenticated or verified. Similarly, the client gateway 650 may prevent unauthorized devices, such as hacker computers or stolen set-top box devices from accessing the private network 610, by denying access to these devices beyond the private access network 666.

For example, when the first representative set-top box device 616 accesses the system 600 via the private access network 666, the client gateway 650 may verify subscriber information by communicating with the subscriber and system store 648 via the private network 610, the first APP switch 638, and the second APP switch 640. Further, the client gateway 650 may verify billing information and status by communicating with the OSS/BSS gateway 644 via the private network 610 and the first APP switch 638. In one embodiment, the OSS/BSS gateway 644 may transmit a query across the first APP switch 638, to the second APP switch 640, and the second APP switch 640 may communicate the query across the public network 612 to the OSS/BSS server 664. After the client gateway 650 confirms subscriber and/or billing information, the client gateway 650 may allow the set-top box device 616 access to IPTV content and VOD content. If the client gateway 650 is unable to verify subscriber information for the set-top box device 616, e.g., because it is connected to an unauthorized twisted pair, the client gateway 650 may block transmissions to and from the set-top box device 616 beyond the private access network 666.

As indicated in FIG. 6, the acquisition tier 606 includes an acquisition tier (AQT) switch 652 that communicates with the private network 610. The AQT switch 652 may also communicate with the operations and management tier 608 via the public network 612. In a particular embodiment, the AQT switch 652 may be coupled to a live acquisition server 654 that receives television or movie content, for example, from content sources 656 through an encoder 655. In a particular embodiment during operation of the IPTV system, the live acquisition server 654 may acquire television or movie content. The live acquisition server 654 may transmit the television or movie content to the AQT switch 652 and the AQT switch 652 may transmit the television or movie content to the CFT switch 630 via the private network 610.

Further, the television or movie content may be transmitted to the video content servers 680, where it may be encoded, formatted, stored, or otherwise manipulated and prepared for communication to the set-top box devices 616, 624. The CFT switch 630 may communicate the television or movie content to the modems 614, 622 via the private access network 666. The set-top box devices 616, 624 may receive the television or movie content via the modems 614, 622, and may transmit the television or movie content to the television monitors 618, 626. In an illustrative embodiment, video or audio portions of the television or movie content may be streamed to the set-top box devices 616, 624.

Further, the AQT switch may be coupled to a video-on-demand importer server 658 that stores television or movie content received at the acquisition tier 606 and communicates the stored content to the VOD server 636 at the client-facing tier 602 via the private network 610. Additionally, at the acquisition tier 606, the video-on-demand (VOD) importer server 658 may receive content from one or more VOD sources outside the IPTV system 600, such as movie studios and programmers of non-live content. The VOD importer server 658 may transmit the VOD content to the AQT switch 652, and the AQT switch 652, in turn, may communicate the material to the CFT switch 630 via the private network 610. The VOD content may be stored at one or more servers, such as the VOD server 636.

When user issue requests for VOD content via the set-top box devices 616, 624, the requests may be transmitted over the private access network 666 to the VOD server 636, via the CFT switch 630. Upon receiving such requests, the VOD server 636 may retrieve the requested VOD content and transmit the content to the set-top box devices 616, 624 across the private access network 666, via the CFT switch 630. The set-top box devices 616, 624 may transmit the VOD content to the television monitors 618, 626. In an illustrative embodiment, video or audio portions of VOD content may be streamed to the set-top box devices 616, 624.

FIG. 6 further illustrates that the operations and management tier 608 may include an operations and management tier (OMT) switch 660 that conducts communication between the operations and management tier 608 and the public network 612. In the embodiment illustrated by FIG. 6, the OMT switch 660 is coupled to a TV2 server 662. Additionally, the OMT switch 660 may be coupled to an OSS/BSS server 664 and to a simple network management protocol (SNMP) monitor 678 that monitors network devices within or coupled to the IPTV system 600. In a particular embodiment, the OMT switch 660 may communicate with the AQT switch 652 via the public network 612.

In an illustrative embodiment, the live acquisition server 654 may transmit the television or movie content to the AQT switch 652, and the AQT switch 652, in turn, may transmit the television or movie content to the OMT switch 660 via the public network 612. In this embodiment, the OMT switch 660 may transmit the television or movie content to the TV2 server 662 for display to users accessing the user interface at the TV2 server 662. For example, a user may access the TV2 server 662 using a personal computer (PC) 668 coupled to the public network 612.

Figure 7:
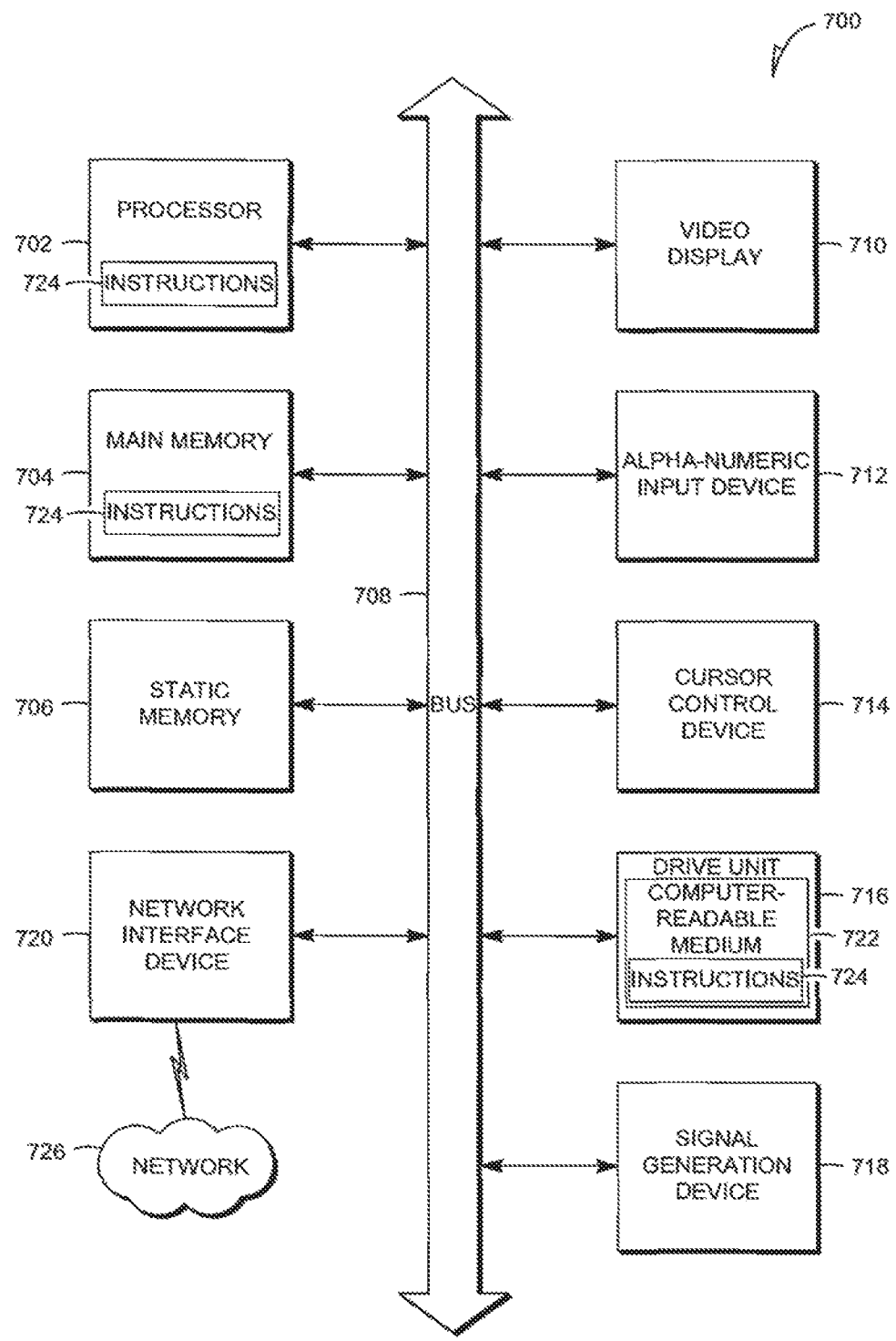
FIG. 7 illustrates a diagrammatic representation of machine in the example form of a computer system within which a set of instructions for causing the machine to perform any one or more of the methodologies discussed herein may be executed.

FIG. 7 shows a diagrammatic representation of machine in the example form of a computer system 700 within which a set of instructions may be executed causing the machine to perform any one or more of the methods, processes, operations, or methodologies discussed herein. The provider 102 may operate on or more computer systems 700 and/or the receiver device 108, and/or the display device 106.1, 106.2, and the video player 302 (see FIGS. 1-3) may include the functionality of the computer system 700.

In an example embodiment, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU) a graphics processing unit (GPU) or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard), a cursor control device 714 (e.g., a mouse), a drive unit 716, a signal generation device 718 (e.g., a speaker) and a network interface device 720.

The drive unit 716 includes a machine-readable medium 722 on which is stored one or more sets of instructions (e.g., software 724) embodying any one or more of the methodologies or functions described herein. The software 724 may also reside, completely or at least partially, within the main memory 704 and/or within the processor 702 during execution thereof by the computer system 700, the main memory 704 and the processor 702 also constituting machine-readable media.

The software 724 may further be transmitted or received over a network 726 via the network interface device 720.

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Certain systems, apparatus, applications or processes are described herein as including a number of modules or mechanisms. A module or a mechanism may be a unit of distinct functionality that can provide information to, and receive information from, other modules. Accordingly, the described modules may be regarded as being communicatively coupled. Modules may also initiate communication with input or output devices, and can operate on a resource (e.g., a collection of information). The modules be implemented as hardware circuitry, optical components, single or multi-processor circuits, memory circuits, software program modules and objects, firmware, and combinations thereof, as appropriate for particular implementations of various embodiments.

Thus, methods and systems for image alteration have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method, comprising:

provisioning, by a provider system comprising a processing system including a processor, a plurality of preprogrammed alteration settings;

accessing, by the provider system, a video signal having a plurality of images and an audio track, wherein the provider system provides the video signal to a set-top box of a subscriber via a provider network;

receiving, by the provider system, an alteration request over a communication network from a remote control device of the subscriber, wherein the plurality of preprogrammed alteration settings are displayed in a selectable cycle of alteration settings, and the alteration request comprises a selected alteration setting from the selectable cycle of alteration settings, wherein the selected alteration setting is selected using the remote control device;

accessing an alteration setting from a plurality of preprogrammed alteration settings stored at a mobile device according to the alteration request;

altering, by the provider system, the plurality of images of the video signal to blur the video signal based on the alteration request and the alteration setting from the plurality of preprogrammed alteration settings, thereby producing a blurred video signal, wherein the blurred video signal obscures an image of the plurality of images responsive to the alteration request, wherein the image includes objectionable material, and wherein the image is obscured by reducing a resolution of the video signal, by setting a plurality of chrominance values associated with the video signal to a constant chrominance value, by setting a plurality of luminance values associated with the video signal to a constant luminance value, by desaturating the video signal or by a combination thereof;

providing, by the provider system, the blurred video signal to the set-top box of the subscriber via the provider network for presentation by equipment of the subscriber, wherein the set-top box provides the blurred video signal to the mobile device;

detecting, by the provider system, a next programming segment in the video signal, wherein the next programming segment does not contain the objectionable material;

restoring, by the provider system, the video signal to obtain a restored video signal for presentation in response to the detecting of the next programming segment; and providing, by the provider system, the restored video signal to the set-top box of the subscriber via the provider network for presentation by the equipment of the subscriber.

2. The method of claim 1, further comprising suppressing, by the provider system, the audio track of the blurred video signal responsive to receiving the alteration request, and wherein the accessing of the video signal comprises receiving the video signal over an internet protocol network.

3. The method of claim 1, wherein the accessing of the video signal comprises accessing the video signal from a digital versatile disc.

4. The method of claim 1, comprising detecting of a restorative event within the blurred video signal further comprising determining a location in the video signal of a next scene change.

5. The method of claim 1, wherein the next programming segment comprises a next chapter on a recording medium.

6. The method of claim 1, wherein the altering of the plurality of images comprises altering the image of the plurality of images based on the alteration setting.

7. The method of claim 1, wherein the blurred video signal is capable of being presented on the mobile device.

8. The method of claim 1, further comprising:
receiving a restore request from the remote control device;
restoring the blurred video signal resulting in the restored video signal including its audio track to its original state responsive to receiving the restore request; and
providing the restored video signal for presentation.

9. The method of claim 1, wherein the alteration request comprises instructions to blur an object in the image.

10. The method of claim 1, wherein:
the receiving the alteration request comprises receiving the alteration request from the subscriber through a remote control; and
the alteration request is selectable by the subscriber among a partial blur request that obscures a part of the image that is smaller than a full size of the image, a full blur request that obscures all of the image, and a restore image request.

11. A media content provider system, comprising:
a processing system including a processor; and
a memory storing executable instructions that, when executed by the processor, perform operations comprising:
provisioning a plurality of preprogrammed alteration settings;
accessing a video signal having a plurality of images;
accessing an alteration setting from the plurality of preprogrammed alteration settings stored at a mobile device according to an alteration request, wherein the plurality of preprogrammed alteration settings are displayed in a selectable cycle of alteration settings, and the alteration request comprises a selected alteration setting from the selectable cycle of alteration settings, wherein the selected alteration setting is selected using the mobile device;
altering the plurality of images of the video signal to blur the video signal based on the alteration request and the alteration setting from the plurality of preprogrammed alteration settings, thereby producing a blurred video signal, wherein the plurality of images include objectionable material, wherein the alteration request is received, over a communication network, from a device of a subscriber, and wherein the alteration request causes the blurred video signal to obscure an image of the plurality of images;
providing the blurred video signal to a set-top box of the subscriber via a provider network for presentation by equipment of the subscriber, wherein the set-top box provides the blurred video signal to the mobile device;
detecting a next programming segment in the video signal, wherein the next programming segment does not contain the objectionable material; and
restoring the video signal for presentation in response to the detecting the next programming segment.

12. The media content provider system of claim 11, wherein the next programming segment comprises a next chapter on a recording medium.

13. The media content provider system of claim 11, wherein the alteration request comprises instructions to blur an object in the image.

14. The media content provider system of claim 11, wherein the alteration request is selectable by the subscriber among a partial blur request that obscures a part of the image that is smaller than a full size of the image, a full blur request that obscures all of the image, and a restore image request.

15. A non-transitory machine-readable storage medium comprising executable instructions that, when executed by a processing system including a processor, perform operations comprising:
provisioning a plurality of preprogrammed alteration settings;
accessing a video signal having a plurality of images;
receiving, by provider equipment, an alteration request over a communication network from a remote control device of a subscriber, wherein the plurality of preprogrammed alteration settings are displayed in a selectable cycle of alteration settings, and the alteration request comprises a selected alteration setting from the selectable cycle of alteration settings, wherein the selected alteration setting is selected using the remote control device;
accessing an alteration setting from a plurality of preprogrammed alteration settings stored at a display device according to the alteration request, wherein a mobile device comprises the display device;
altering, by the provider equipment, the plurality of images of the video signal to blur the video signal based on the alteration request and the alteration setting from the plurality of preprogrammed alteration settings, thereby producing a blurred video signal, wherein the blurred video signal obscures an image of the plurality of images, wherein the plurality of images includes objectionable material;

providing the blurred video signal to equipment of the subscriber by way of a provider network, for presentation on the display device;

detecting, during presentation of the blurred video signal, a next programming segment in the video signal, wherein the next programming segment does not contain the objectionable material;

restoring the blurred video signal to its original state, resulting in a restored video signal, responsive to the detecting of the next programming segment; and providing the restored video signal to the equipment of the subscriber by way of the provider network for presentation, wherein the receiving of the alteration request comprises receiving the alteration request from the subscriber through a remote control, in real-time, as the subscriber is watching content of the video signal.

16. The non-transitory machine-readable storage medium of claim 15, wherein accessing the video signal includes receiving the video signal over an internet protocol network.

17. The non-transitory machine-readable storage medium of claim 15, wherein the alteration request is selectable by the subscriber among a partial blur request that obscures a part of the image that is smaller than a full size of the image, a full blur request that obscures all of the image, and a restore image request.

18. The non-transitory machine-readable storage medium of claim 15, wherein the next programming segment comprises a next news story.

19. The non-transitory machine-readable storage medium of claim 15, wherein the alteration request comprises instructions to blur an object in the image.

20. The non-transitory machine-readable storage medium of claim 15, wherein the accessing of the video signal comprises accessing the video signal from a digital versatile disc.

* * * * *